United States Patent [19]
Sonneman

[11] 3,804,125
[45] Apr. 16, 1974

[54] PUMP PULSATION DAMPENER

[75] Inventor: George B. Sonneman, Baltimore, Md.

[73] Assignee: The Bendix Corporation, Southfield, Mich.

[22] Filed: Sept. 28, 1972

[21] Appl. No.: 292,931

[52] U.S. Cl.................................. 138/30, 417/540
[51] Int. Cl............................................. F16l 55/04
[58] Field of Search ................. 138/30, 31; 73/392; 417/540, 541

[56] References Cited
UNITED STATES PATENTS

| | | | |
|---|---|---|---|
| 2,094,457 | 9/1937 | Lattner | 417/540 X |
| 2,544,289 | 3/1951 | Andrews | 138/30 X |
| 2,902,988 | 9/1959 | Rippingille | 138/30 X |
| 1,958,009 | 5/1934 | McKee | 138/30 |

*Primary Examiner*—Charles A. Ruehl
*Attorney, Agent, or Firm*—Bruce L. Lamb; W. G. Christoforo

[57] ABSTRACT

A gas tight housing has a first port communicating ambient air with a first interior chamber and second and third ports respectively communicating the suction line of a pulsating pump and the gas to be pumped with a second interior chamber. An elastomer bag separates the interior portion of the housing into the first and second chambers thereby sealing the chambers gas tight from one another. A spring within the elastomer bag expands the sleeve to thereby expand the second chamber and to contract the first chamber. The spring force is opposed by atmospheric pressure in the first chamber. In operation the elastomer bag remains partially collapsed, collapsing further during the pump suction stroke and expanding in the interval between suction strokes.

4 Claims, 3 Drawing Figures

PUMP PULSATION DAMPENER

BACKGROUND OF THE INVENTION

This invention relates to pulsation dampeners for use with pulsating pumps such as piston or diaphragm pumps. The invention particularly relates to such pulsation dampeners of small size which may be used, for example, with personal and portable, respirable dust collectors.

Personal dust collectors are normally used in dusty work areas, such as coal mines, to sample the environmental atmosphere in the immediate vicinity of the human worker to thus monitor the respirable quality of the air. A worker in such a dusty atmosphere will wear on his person the respirable dust collector. The dust collector is normally comprised of a cyclone dust separater, a dust filter, a pump, a connecting tubing and controls for drawing environmental air through the cyclone dust separator where heavy dust particles are removed from the air stream and through the dust filter by means of the pump. The amount of dust collected by the dust filter during a known time period is a measure of the environmental quality of the respirable air. It has been found that effective dust collection in the dust filter is based on theoretical constant flow of air through the filter. Pulsating flow causes rapid acceleration-deceleration of the air stream thereby resulting in improper separation of the dust in the cyclone dust separater with resultant improper dust filter collection.

Pulsating pumps such as piston or diaphragm pumps can be made quite small and inexpensively and thus are quite suitable for use on personal dust collectors. However, these pulsating pumps provide an undesirable pulsating air flow through the cyclone dust separater and dust filter. It is thus necessary that some means for dampening the pulsations be provided. Currently used pump pulsation dampeners are relatively large and heavy and hence are not particularly suitable for use with personal, respirable dust collectors.

It is thus an object of this invention to provide a light and small pump pulsation dampener. This is accomplished by providing a housing, the interior of which is divided into two chambers by an elastomer bag, the two chambers thereby being isolated from one another. A biasing means such as a spring is provided within the elastomer bag to thereby expand the bag and hence one of the chambers, termed a working chamber. Two ports provide communication with the working chamber. One of these ports is connected to the suction side of the pump while the other port is connected to communicate with the atmosphere to be tested through the cyclone dust separater and dust filter. A second chamber which has collapsed when the working chamber is expanded communicates with atmospheric air. The atmospheric air in the second chamber opposes the biasing force applied to the elastomer bag.

In operation, the initial action of the pump is to partially collapse the elastomer bag to a working position somewhat intermediate the fully expanded and the fully collapsed positions. Subsequent pump suction strokes collapse the bag somewhat more than its working position while during the interval between suction strokes the bag expands somewhat greater than its working position. The dampener is so designed and constructed that the bag during normal operation never collapses completely nor expands completely.

DESCRIPTION OF THE PREFERRED EMBODIMENT

Figure 1:
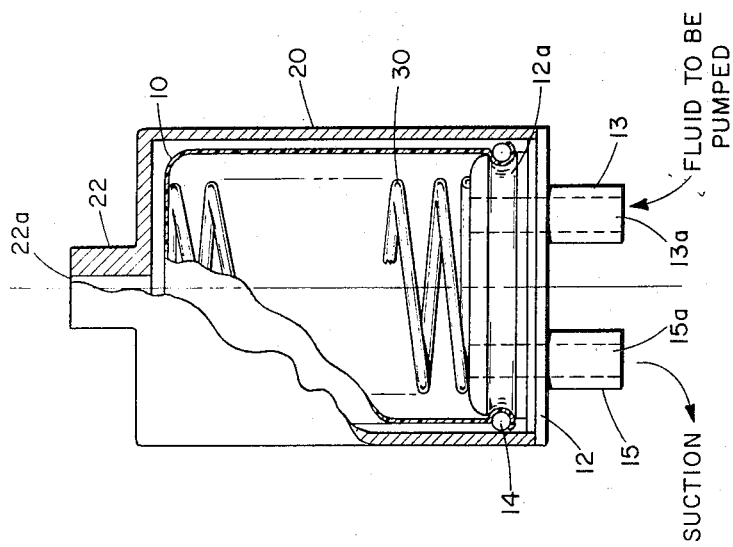
FIG 1 shows the invention partially cut away to show the interior construction details.

Referring first to FIG. 1 there is seen a pump pulsation dampener built in accordance with the invention and having an elastomer bag 10. The open end of the elastomer bag is sealed in a groove 12a of a disc shaped header 12 by a sealing ring 14. The exact means of sealing bag 10 to header 12 is not essential to the operation of the invention, it being only necessary that the bag be secured reliably to the header and generally air tight and so that the bag above the header remains essentially flexible. Header 12 includes two downward depending ports, 13 and 15, having central bores 13a and 15a, respectively, which communicate with the interior of the elastomer bag, this interior being termed the working chamber. One port is connected, suitably by tubing, to the environment being sampled through a dust filter and cyclone dust separater. The other port is connected, suitably through tubing, to the suction side of the pump. Header 12 is sealed into the open end of a generally cylindrical case 20 to thereby define a second chamber between the outside wall of elastomer bag 10 and the inside surface of case 20. The longitudinal axis of elastomer bag 10 generally coincides with the longitudinal axis of case 20. The closed end of case 20 includes a port 22 having a central bore 22a which provides generally unrestricted communication between the second chamber and the environment being pumped.

The elastomer bag is expanded by a suitable biasing force which in this embodiment is provided by coil spring 30 acting between the top surface of header 12 and the inside upper surface of bag 10.

In operation, the initial action of the pump collapses bag 10 against the biasing force provided by spring 30 to an intermediate working position wherein the working chamber is partially collapsed. Subsequent suction strokes cause the working chamber to collapse somewhat more to what is termed an inner working limit while during the period between suction strokes the working chamber expands to what is termed an outer working limit in response to the biasing spring force to a size somewhat larger than when it is in its working position.

The pump pulsation dampener is designed in such a manner that the working chamber in normal operation never collapses completely and never expands to its full extent but rather the working chamber collapses to approximately one-half its original volume and thereafter collapses and expands somewhat, in response to the action of the pump, about that position. The total volume displaced as the working chamber collapses from its outer working limit to its inner working limit is about one-half the pump displacement volume.

Figure 2:
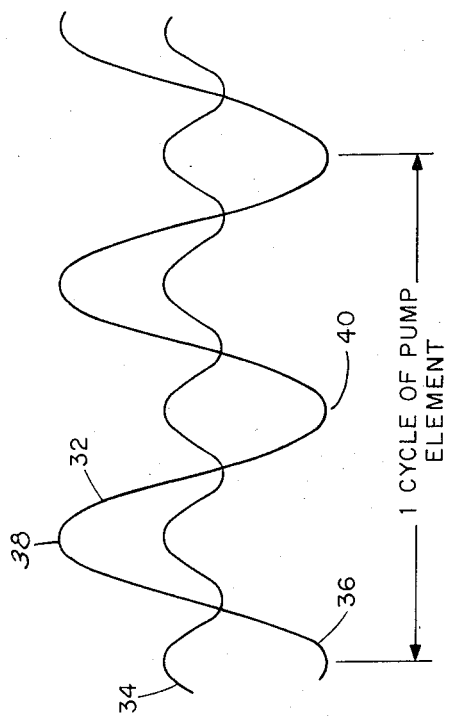
FIG. 2 shows idealized curves which are helpful in explaining the operation of the invention when used with a double acting pump.

Since the working chamber expands during the period between pump suction strokes the dampener provides an additional suction period between the pump suction strokes thereby essentially doubling the effective pump suction repetition frequency. This action can be explained with respect to FIG. 2, reference to which figure should now be made. In this figure, it is assumed that the pump is a double acting pump, that is, it provides two suction periods during each revolution of its crank shaft in the case of a piston pump and there are two suction periods during each cycle of diaphragm motion in a diaphragm pump. For clarity, the curves of this figure are idealized in that the dampening effects of gas flow through the system are ignored except for the action of the pump pulsation dampener. Curve 32 illustrates the gas flow with respect to time through the system where no pump pulsation dampener is used. Curve 34 shows the same air flow except with a pump pulsation dampener provided. In referring to FIG. 2 it is assumed that at point 36 the pump piston or diaphragm starts in the up direction from its bottom position so that the flow in the system at that time is a minimum. As the pump element, piston or diaphragm, moves up the flow increases until it reaches a maximum when the pump element is half-way through its stroke, for example, at point 38. Thereafter, as the pump element continues up toward its top position the flow will again decrease towards a minimum condition as at point 40. Another suction cycle will occur as the pump element moves back to its starting position at the bottom of its stroke. Thus, in the case of a double acting pump there are two suction cycles for each cycle of the pump element. With respect to curve 34, this curve will show a peak flow to coincide generally with the peak of the undamped flow. However, where the undamped flow would otherwise show a minimum flow condition the damped flow will show a second peak since at that time the dampener working chamber is expanding thus to provide this extra peak. It is thus seen that the dampener not only smooths out the pump pulsations but also doubles the frequency thereof.

Figure 3:
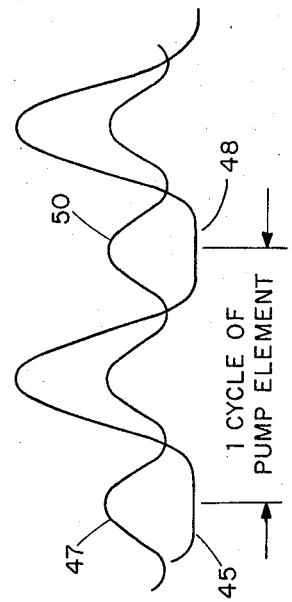
FIG. 3 shows idealized curves which are helpful in explaining the operation of the invention when used with a single acting pump.

Refer now to FIG. 3 where a curve 45 shows the undamped flow and curve 47 shows the damped flow for a single acting pump. One cycle of the pump element now produces only one suction cycle of the undamped flow. As before, however, at the minimum undamped flow such as at 48 the elastomer bag is expanding to thus produce an extra suction pulse, such as 50, in the damped flow.

In a dampener actually built the elastomer bag material was latex approximately 0.002 thick. The bag volume in its fully expanded condition was 0.45 cubic inches. The ratio of bag volume to pump displacement was 6/1. The biasing force which tended to expand the elastomer bag was a spring having a free length of one inch and made of 0.025 inch diameter stainless steel. The spring outside diameter was 0.775 inches and the pitch of the spring coils was 0.13 inches. When the dampener was assembled and the bag was in its fully expanded condition, the spring fit closely within the bag and was under no essential initial stress. With the pump operating, the working chamber collapsed to approximately 60 percent of its fully expanded capacity. At that time, that is, when collapsed to 60 percent of its expanded capacity, the spring exerted a biasing force of 40 grams.

The invention claimed is:

1. A pulsation dampener for a pulsating pump for pumping gas and having a suction line comprising:
    a housing having a first port adapted to communicate a first chamber within said housing with a source of relatively constant gas pressure; second and third ports adapted to communicate a second chamber within said housing with respectively said suction line and a gas to be pumped by said pump;
    an elastomer bag dividing the interior of said housing into said first and second chambers, said chambers being thereby sealed from one another;
    spring means for applying a biasing force to said elastomer bag to expand said second chamber and contract said first chamber, said biasing force being opposed by the force exerted on said elastomer bag by the relatively constant pressure fluid in said first chamber, said elastomer bag having its volume partially contracted against said biasing force in response to operation of said pump and wherein said elastomer bag is designed to have an expanded volume about six times the displacement volume of said pump.

2. The dampener of claim 1 wherein said source of relatively constant gas pressure and said gas to be pumped comprise atmospheric air.

3. The dampener of claim 1 wherein said elastomer bag and spring means are designed to permit said elastomer bag to contract to about 60% of its expanded volume during operation of said pump.

4. The dampener of claim 3 wherein said source of relatively constant gas pressure and said gas to be pumped comprise atmospheric air.

* * * * *